United States Patent
Feng et al.

(10) Patent No.: US 12,450,116 B2
(45) Date of Patent: Oct. 21, 2025

(54) METHOD AND APPARATUS FOR DETECTING APPLICATION FREEZING PROBLEM, AND DEVICE AND STORAGE MEDIUM

(71) Applicant: BEIJING BYTEDANCE NETWORK TECHNOLOGY CO., LTD., Beijing (CN)

(72) Inventors: Yadong Feng, Beijing (CN); Kunlun Bai, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/256,954

(22) PCT Filed: Nov. 29, 2021

(86) PCT No.: PCT/CN2021/133878
§ 371 (c)(1),
(2) Date: Jun. 12, 2023

(87) PCT Pub. No.: WO2022/160913
PCT Pub. Date: Aug. 4, 2022

(65) Prior Publication Data
US 2024/0036969 A1    Feb. 1, 2024

(30) Foreign Application Priority Data
Jan. 27, 2021   (CN) .......................... 202110112306.6

(51) Int. Cl.
*G06F 11/07* (2006.01)
(52) U.S. Cl.
CPC ........ *G06F 11/0793* (2013.01); *G06F 11/079* (2013.01)

(58) Field of Classification Search
CPC ............... G06F 11/079; G06F 11/0793; G06F 11/0715; G06F 11/0757; G06F 11/0778;
(Continued)

(56) References Cited

U.S. PATENT DOCUMENTS

| 2009/0241095 A1* | 9/2009 | Jones ................. G06F 11/3419 717/128 |
| 2011/0320858 A1* | 12/2011 | Koktan ............... G06F 11/3466 714/2 |

FOREIGN PATENT DOCUMENTS

| CN | 108446199 A | 8/2018 |
| CN | 109582536 A | 4/2019 |

(Continued)

OTHER PUBLICATIONS

International Search Report (with English translation) and Written Opinion issued in PCT/CN2021/133878, dated Mar. 4, 2022, 13 pages provided.

(Continued)

*Primary Examiner* — Yair Leibovich
(74) *Attorney, Agent, or Firm* — Astute IP Law Group

(57) ABSTRACT

The present disclosure relates to a method, and apparatus for detecting an application freezing problem, and a device and a storage medium. The method comprises: detecting time consumed for a Runloop in a first thread of an application executing a task; when it is detected that the consumed time reaches a preset threshold value, at least acquiring a call stack of the first thread and the current first execution state of the Runloop, and writing the call stack into a preset file; detecting an execution state of the Runloop after the time consumed for the task reaches the preset threshold value; and if the Runloop does not enter a second execution state after the first execution state before the application is closed, sending the preset file to a remote server. By means of the (Continued)

solution provided in the embodiments of the present disclosure, an application freezing problem can be identified and detected.

19 Claims, 5 Drawing Sheets

(58) Field of Classification Search
CPC ............ G06F 11/3423; G06F 11/3466; G06F 2201/81; G06F 11/302; Y02D 10/00
USPC ........................................................ 714/38.1
See application file for complete search history.

(56) References Cited

FOREIGN PATENT DOCUMENTS

| | | |
|---|---|---|
| CN | 109840177 A | 6/2019 |
| CN | 109902011 A | 6/2019 |
| CN | 110990243 A | 4/2020 |
| CN | 111538638 A | 8/2020 |
| CN | 111625456 A | 9/2020 |
| CN | 112231132 A | 1/2021 |
| CN | 112764959 A | 5/2021 |

OTHER PUBLICATIONS

Flying dog, "Stuck and stuck monitoring", https://blog.csdn.net/xiaoming100001/article/details/107501757, Jul. 22, 2022, with English translation.

Wang, "(Non-official translation: How to Fix Applications Not Responding Issue)", New Edited: Computer Assembly and Maintenance, 2nd Edition, CN, China Railway Press, Jan. 31, 2015, 6 pages.

Notification to Grant Patent Right for Invention for Chinese Patent Application No. 202110112306.6, mailed on Apr. 20, 2023, 6 pages.

\* cited by examiner

METHOD AND APPARATUS FOR DETECTING APPLICATION FREEZING PROBLEM, AND DEVICE AND STORAGE MEDIUM

The present disclosure is a national stage of International Application No. PCT/CN2021/133878, filed on Nov. 29, 2021, which claims priority to Chinese Patent Application No. 202110112306.6, tided "METHOD AND APPARATUS FOR DETECTING APPLICATION FREEZING PROBLEM, AND DEVICE AND STORAGE MEDIUM", filed with the China National Intellectual Property Administration on Jan. 27, 2021, both of which are incorporated herein by reference in their entireties.

FIELD

The present disclosure relates to the field of computer technology, and in particular to a method and apparatus for monitoring application freezing problem, a device, and a storage medium.

BACKGROUND

In the conventional technologies, the lagging problem of an application (APP) in the iPhone Operation System (abbreviated as iOS) can be monitored. However, there is no monitoring solution for the freezing problem of the application. Therefore, a technical problem to be solved by those skilled in the art is to monitor application freezing problem in the iOS environment.

SUMMARY

In order to solve or at least partly solve the above technical problems, a method and apparatus for monitoring application freezing problem, a device, and a storage medium are provided according to the present disclosure.

In a first aspect, a method for monitoring application freezing problem is provided according to the present disclosure. The method includes: monitoring a time consumption for executing a task by a message loop mechanism (also referred to Runloop) in a first thread of an application, where the application is carried in an iOS system; acquiring a call stack of the first thread and a current first execution state of the Runloop, in a case that it is monitored that the time consumption reaches a preset threshold; monitoring an execution state of the Runloop after the time consumption reaches the preset threshold; sending the call stack of the first thread to a remote server, in a case that the Runloop does not enter a second execution state after the first execution state until the application is closed.

In a second aspect, an apparatus for monitoring application freezing problem is provided according to the present disclosure, the apparatus includes: a first monitoring module, a first acquisition module, a second monitoring module and a sending module.

The first monitoring module is configured to monitor time consumption for executing a task by a Runloop in a first thread of an application, where the application is carried in an iOS system.

The first acquisition module is configured to at least acquire a call stack of the first thread and a current first execution state of the Runloop, in a case that it is monitored that the time consumption reaches a preset threshold.

The second monitoring module is configured to monitor an execution state of the Runloop after the time consumption reaches the preset threshold.

The sending module is configured to send the call stack of the first thread to a remote server, in a case that the Runloop does not enter a second execution state after the first execution state until the application is closed.

In a third aspect, a terminal device is provided according to the present disclosure, the terminal device includes: a processor; and a memory, where the memory stores a computer program; and the computer program, when executed by a processor, causes the processor to implement the above method of the first aspect.

In a fourth aspect, a computer readable store medium storing a computer program is provided according to the present disclosure, where the computer program, when executed by a processor, causes the processor to implement the above method of the first aspect.

Compared with the conventional technology, the technical solutions provided by the present disclosure have the following advantages.

In the present disclosure, by monitoring the time consumption for executing the task by the Runloop in a first thread of the application, monitoring the execution state of the Runloop after the task time consumption reaches the preset threshold is monitored in response to monitoring that the time consumption reaches the preset threshold; until the application is closed. If the execution state of the Runloop remains the first execution state when the task time consumption reaches the preset threshold and does not enter a second execution state, it is determined that the application occurs the freezing problem, thereby realizing the detection of the application freezing problem, such as identifying the freezing problem in the application. In addition, in the present disclosure, only when the application is closed and Runloop still fails to enter the second execution state after the first execution state, it is then determined that the application has a freezing problem, which can prevent an incorrect determination of the lagging problem of the application as the freezing problem of the application, thereby improving the accuracy of identifying the freezing problem.

BRIEF DESCRIPTION OF THE DRAWINGS

The drawings herein are incorporated into the specification and constitute a part of the specification, which show embodiments which comply with the present disclosure. The drawings and the specification are used as a whole to explain the principle of the present disclosure.

In order to more clearly illustrate the embodiments of the present disclosure or the technical solutions in the conventional art, the drawings used in the description of the embodiments or the conventional art are briefly introduced below. It is apparent that, for those skilled in the art, other drawings can be obtained according to the provided drawings without any creative effort.

DETAILED DESCRIPTION OF EMBODIMENTS

In order to understand the above purposes, features, and advantage of the present disclosure more clearly, the technical solutions according to the present disclosure will be further described. It should be noted that the embodiments of the present disclosure and the features in the embodiments may be combined with each other if there is no conflict.

In the following description, numerous specific details are set forth in order to provide thorough understanding of the present disclosure. However, the present disclosure may also be implemented in other ways different from those described here. It is apparent that the embodiments in the specification are only a part of the embodiments of the present disclosure, rather than all the embodiments.

In the conventional technology, the freezing problem of the application in the iOS environment is mainly monitored based on the lagging monitoring solution. That is, in the process of the user using the APP, if the page response time exceeds a lagging threshold once, it is determined as one lag. In this case, the APP writes the call stack of the main thread into the log and reports it to the remote server for analysis and processing. However, such lagging monitoring solution has the following problems.

1. It cannot distinguish freezing problem from lagging problem. There may be multiple lagging problems in the process of APP startup to shutdown, which will lead to the issue of too many reported problems. It is difficult for the remote server to distinguish between the freezing problem and the lagging problem in these reported problems. In fact, the definition of freezing is a part of lag that has a long duration and has not recovered in the end. The final result of the freezing may be an application breakdown due to triggering the protection mechanism of the iOS system, or may make the user close the application actively due to the user's impatient. The effect of this part of the problem on user experience is far greater than the effect of the lagging problem on user experience.

2. In some scenarios, once the APP on the terminal device lags, it may continuously occur the lagging multiple times in a short period of time. Capturing of the call stack, writing and reporting of the log will affect the performance of the terminal device. Thus, the lag may be worse due to the frequent operations such as capturing the call stack, or writing log.

3. In the lagging monitoring solution, the call stack at a point in time is generally used to describe the lagging state for a time period. This description method will mislead the problem analysis and lead to inaccurate problem analysis. For example, one lag continues for 100 ms. The execution of method A lags for the first 99 ms, and the progress switches to method B at the last 1 ms. At this time, the call stack captured by the lagging monitoring is the call stack of method B. Actually, the method B is not main cause of the lagging, which may cause a misanalysis.

Figure 1:
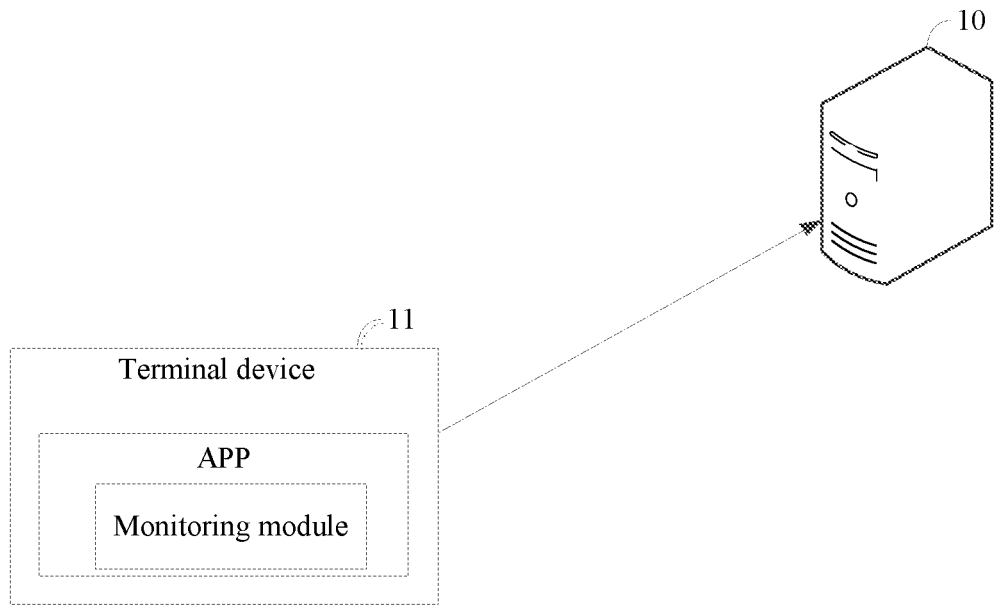
FIG. 1 is a schematic diagram of an application scenario according to an embodiment of the present disclosure.

For the above-mentioned problems in the conventional technology, a method for monitoring application freezing problem is provided according to an embodiment of the present disclosure. As an example, FIG. 1 is a schematic diagram of an application scenario according to an embodiment of the present disclosure. As shown in FIG. 1, this scenario at least includes a terminal device 11 and a remote server 10. The terminal device 11 can be interpreted as a device equipped with an iOS system, by which APP can run on the iOS system, such as a mobile phone, a tablet computer, a car machine. The remote server 10 can be understood as for example a cloud platform server with data sending and receiving functions and data processing functions. In the scenario provided by the embodiment of the present disclosure, the APP carried in the terminal device 11 is integrated with a monitoring module configured to monitor the freezing problem of the APP. Once monitoring the freezing problem of the APP, the monitoring module can report the freezing problem to the remote server 10 for analysis and processing. The implementation method of the monitoring module will be exemplarily described below in conjunction with some exemplary embodiments.

Figure 2:
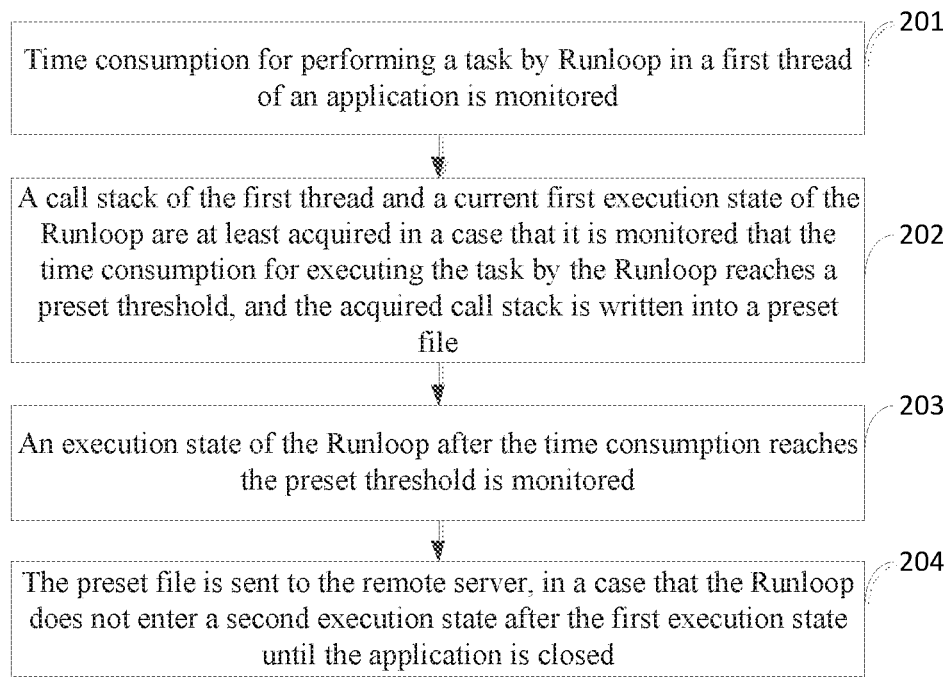
FIG. 2 is a flowchart of a method for monitoring application freezing problem according to an embodiment of the present disclosure.

Exemplarily, FIG. 2 is a flowchart of a method for monitoring application freezing problem according to an embodiment of the present disclosure. The method can be executed by the monitoring module in FIG. 1 exemplarily. As shown in FIG. 2, the method includes steps 201 to 204 as follows.

In step 201, time consumption for performing a task by Runloop in a first thread of an application is monitored.

The application referred to in this embodiment can be understood as an application carried in the iOS system. The first thread can exemplarily be understood as a main thread of the application.

Figure 3:
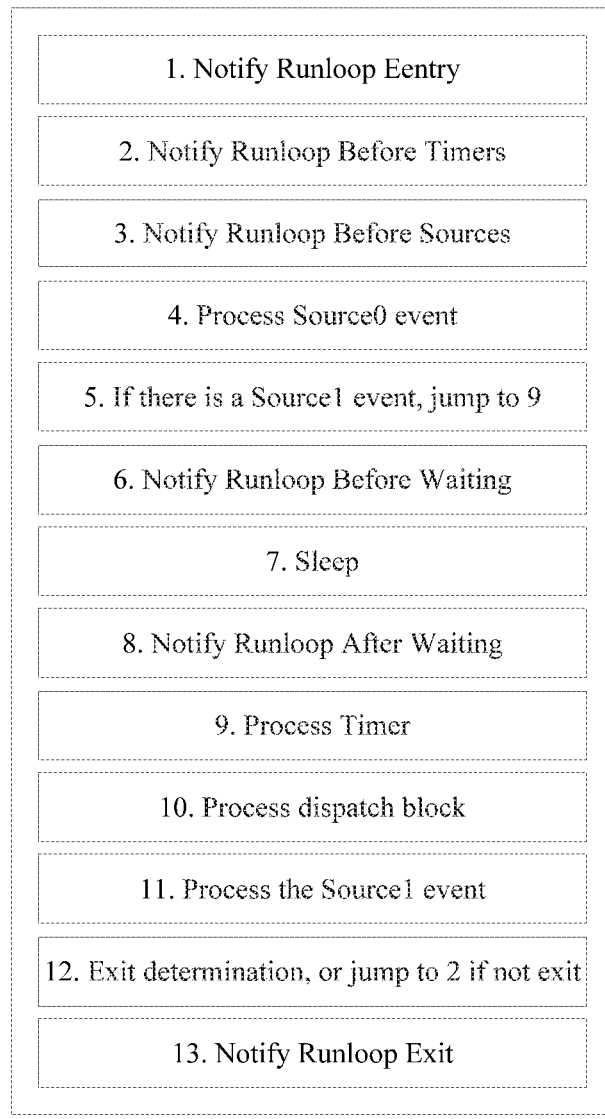
FIG. 3 is a schematic diagram of an execution flow of Runloop according to an embodiment of the present disclosure.

For example, FIG. 3 is a schematic diagram of an execution flow of Runloop according to an embodiment of the present disclosure. "Notify Runloop Entry" refers to notifying Runloop to enter a task execution process. "Notify Runloop Before Timers" refers to notifying Runloop that the timer event is about to be processed. "Notify Runloop Before Sources" refers to notifying Runloop that the Source0 event is about to be processed. "Process Source0 event" indicates that Runloop processes the Source0 event. "If there is a Source1 event, jump to 9" indicates that after the Source0 event was processed, if a Source1 event to be processed exists, the progress jumps to the execution process 9 and continues to execute the execution process 9. "Notify Runloop Before Waiting" refers to notifying Runloop that is about to enter a sleep mode. "Notify Runloop After Waiting" refers to notifying Runloop to end sleep and wake up from the sleep state. "Process Timer" indicates that Runloop processes a timer event after waking up. "Process dispatch block" indicates that Runloop processes the dispatching block. "Process the Source1 event" indicates that the Runloop processes the Source1 event. "Exit determination, or jump to 2 if not exit" indicates that the Runloop determines whether to exit the task; if it is determined to exit, then the Runloop exits the task, otherwise jumps to a process 2 to continue processing. In this case, when the processes 1, 2, 3, 6, 8, 13 are executed, Runloop may report the corresponding execution states to the monitoring module, so that the monitoring module can obtain the real-time execution state information of the Runloop.

Referring to FIG. 3, the process of executing the task by the Runloop is mainly from a process 1 to a process 6, and from a process 9 to a process 2. In this embodiment, the time consumption for executing a task by Runloop in a first thread can be understood as an exemplary time consumption of the Runloop from the process 1 to the process 6, and from the process 9 to the process 2. In other words, in the present disclosure, the time consumption for executing the task by the Runloop refers to a time consumed from a time when the Runloop enters process 1 to a time when the Runloop enters the sleep state or exits the task. The time consumption for executing the task by the Runloop does not include the sleep time. Once the Runloop is in the sleep state, the timing will stop and the accumulated timing results will be reset. The timing will restart from 0 when the Runloop is awakened again.

In this embodiment, the time consumption for executing the task by the Runloop may be monitored by one or more preset timers. For example, in one embodiment, when the application carrying the Runloop is run, the monitoring apparatus allocates resources for the preset timer. The timer accumulates the time consumption for executing the task by the Runloop at a preset time interval. When the application carrying the Runloop is monitored to be suspended, the monitoring apparatus stops allocating resources for the timer, so that the timer pauses timing. When the application carrying the Runloop is monitored to be resumed, it continues to allocate resources for the timer so that the timer continues to count the time consumption for executing the task by the Runloop. For the convenience of understanding, an example is used for illustration below.

Figure 4:
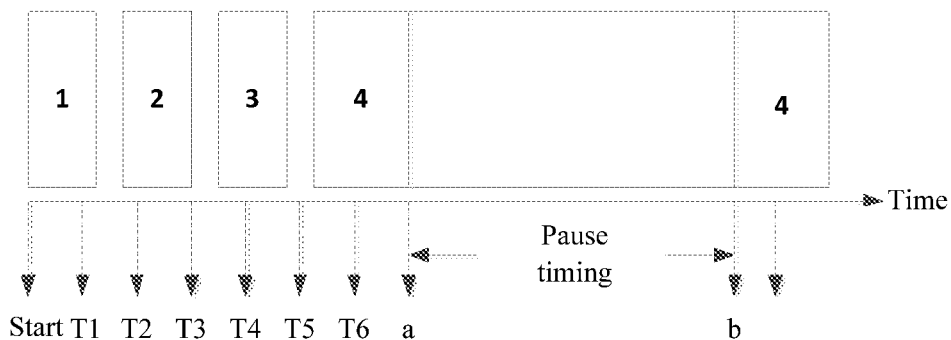
FIG. 4 is a schematic diagram of a timing method according to an embodiment of the present disclosure.

For example, FIG. 4 is a schematic diagram of a timing method according to an embodiment of the present disclosure. Processes 1, 2, 3, and 4 in FIG. 4 correspond to the processes 1, 2, 3, and 4 in FIG. 3, respectively. When reaching a time a, the application carrying the Runloop is suspended, and the application is resumed at a time b. As shown in FIG. 4, if the period from the time a to the time b is included in the time consumption for executing the task by the Runloop, there will be a mismatch between the actual task execution time and the timing time, resulting in incorrect determination of the freezing problem. In order to avoid this problem, the timer in this embodiment is configured to accumulate the time consumption for executing the task by the Runloop at a preset time interval. When the application carrying the Runloop is monitored to be suspended, the timer will be suspended. When the application is monitored to be resumed, the timer will be resumed. In other words, as shown in FIG. 4, the time consumption for executing the task by the Runloop is accumulated at times T1, T2, T3, T4, T5, and T6, the timing is suspended at the time a, and the timing is resumed at the time b until the Runloop enters the next execution state or the application is closed. In this way, even if a timing error occurs, it is only a timing error in one time interval, thereby improving the accuracy of monitoring the time consumption for executing the task by the Runloop and determining the freezing problem in this embodiment.

In step 202, a call stack of the first thread and a current first execution state of the Runloop are at least acquired in a case that it is monitored that the time consumption for executing the task by the Runloop reaches a preset threshold, and the acquired call stack is written into a preset file.

Figure 5:
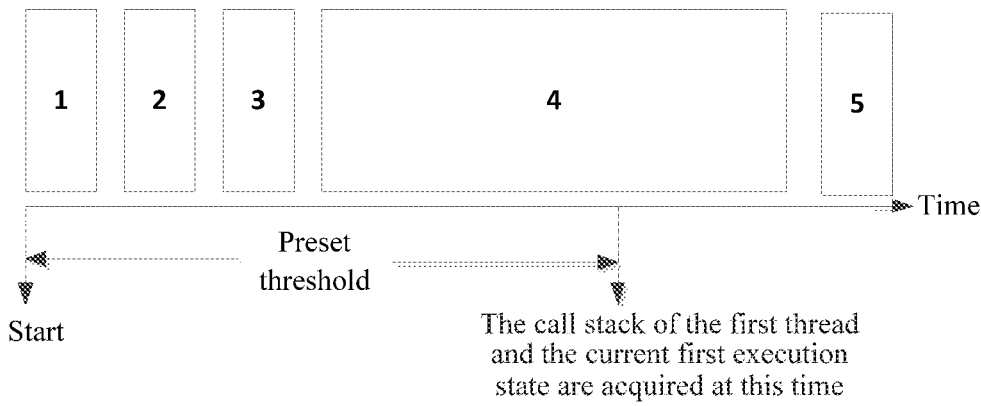
FIG. 5 is a schematic diagram of a method for acquiring a call stack and an execution state of Runloop according to an embodiment of the present disclosure.

As an example, FIG. 5 is a schematic diagram of a method for acquiring a call stack and an execution state of Runloop according to an embodiment of the present disclosure. Processes 1, 2, 3, 4, and 5 in FIG. 5 correspond to the processes 1, 2, 3, 4, and 5 in FIG. 3, respectively. As shown in FIG. 5, when the Runloop in the first thread executes the process 4 in FIG. 5, the time consumption of the task reaches the preset threshold. The call stack of the first thread at this moment and the first execution state of the Runloop at this moment (i.e., the Runloop is in a state of processing the Source0 event) are at least acquired at this time, and the acquired call stack is written to the preset file as a candidate object for the freezing problem. The preset file can be exemplarily understood as, but not limited to, a log file for recording freezing problems. In this embodiment, when it is monitored that the time consumption for executing the task by the Runloop reaches a preset threshold, only the call stack of the first thread at this moment is written into the preset file as the candidate object of the freezing problem, rather than determining that the freezing problem must occur. In fact, in FIG. 5, the Runloop only has a lagging problem when it executes the process 4, rather than a freezing problem.

The above preset threshold in this embodiment can be set as required, which will not be limited to a certain specific value. In fact, in some embodiments, the preset threshold can be set to a value larger than the lagging threshold in the conventional technology, so as to reduce the incorrect determination and improve the accuracy of determining the freezing problem.

It is apparent that the embodiment in FIG. 5 is only an exemplary illustration of the embodiment of the present disclosure rather than the only limitation. In fact, in order to enrich the reported data, the remote server can have enough data for analysis to obtain an accurate freezing cause. In other embodiments, when it is monitored that the time consumption for executing the task by the Runloop reaches a preset threshold, the call stacks of other threads (such as a second thread) in the application other than the first thread may be acquired, and the acquired call stacks of other threads are also written into the preset file.

Furthermore, when the remote server analyzes and processes the freezing problem of a certain application, it can comprehensively analyze and process the multiple preset files reported by multiple terminal devices installed with the same application and obtain the cause of the freezing problem of the application. Alternatively, the preset files reported by respective terminal devices installed with the same application can be processed separately to obtain the cause of the freezing problem of the application on the respective terminal devices.

In step 203, an execution state of the Runloop after the time consumption reaches the preset threshold is monitored.

In this embodiment, in response to monitoring that the time consumption for executing the task by the Runloop exceeds the preset threshold, the execution state of the Runloop after the time consumption reaches the preset threshold can be monitored at a preset second time interval. The second time interval can be set as required, which is not limited to a specific value. The designation of the second time interval in this embodiment is only used to distinguish multiple time intervals, which has no other meanings.

In step 204, the preset file is sent to the remote server, in a case that the Runloop does not enter a second execution state after the first execution state until the application is closed.

The second execution state can be understood as any execution state after the first execution state.

In practical application, the execution state of the Runloop may be changed within a time period after the application is lagged. That is, instead of holding in the execution state at the moment when the lag occurs, the Runloop may enter a next state after the time period. In the case that the application is frozen, the execution state of the Runloop remains in the execution state at the moment when the application is frozen, which does not enter the next execution state. Based on this, in this embodiment, the identification and determination of the freezing problem is realized by monitoring the execution state of the Runloop after the time consumption of the task reaches the preset threshold. In other words, when it is monitored that the Runloop remains at the first execution state without any change until the application is closed (it may be closed due to the application crashing, or it may be closed by the user actively), it is determined that the application occurs the freezing problem. The preset file, in which the call stack of the first thread and/or the second thread of the application is recorded, is sent to the remote server at a preset reporting time. For example, the preset reporting time may be a time when the application starts for the first time after being frozen and closed. Thus, the remote server analyzes and processes the freezing problem based on information of the call stack recorded in the preset file. If it is monitored that the execution state of the Runloop is switched from the first execution state to the second execution state before the application is closed, it indicates that this problem is a lagging problem rather than a freezing problem. In this embodiment, in the case of the lagging problem, the preset file will not be sent to the remote server, which can prevent the data of the lagging problem from misleading the analysis of the freezing problem. In some embodiments, after the lagging problem in the application is determined, the call stack recording the lagging problem may also be deleted from the preset file, so as to save storage resources.

In addition, considering that the duration of the freezing time is an important factor affecting the user experience, in order to be able to analyze the tolerance of the user for the freezing problem, in some embodiments, the monitored time consumption for executing the task by the Runloop can further be written into the preset file, and be updated at a preset time interval. In this way, the time consumption for executing the task by the Runloop can be carried in the preset file and reported to the remote server together. In other words, in some embodiments, after it is monitored that the time consumption for executing the task by the Runloop reaches the preset threshold value, the time consumption for executing the task by the Runloop will continue to be accumulated and counted at the preset time interval, and the total time consumption for executing the task by the Runloop is carried in the preset file and reported to the remote server.

In an embodiment of the present disclosure, the time consumption for executing the task by the Runloop in a first thread of the application is monitored. When it is monitored that the time consumption for executing the task by the Runloop exceeds a preset threshold, the execution state of the Runloop after the task time consumption reaches the preset threshold is monitored. When the application is closed, if the execution state of the Runloop remains the first execution state when the task time consumption reaches the preset threshold and does not enter a second execution state, it is determined that the application occurs the freezing problem, thereby realizing the identification and monitoring of the application freezing problem. Only when the application is closed and Runloop still fails to enter the second execution state after the first execution state, it is determined that the application has a freezing problem, which can prevent the application from mistaking the lagging problem as the freezing problem, thereby improving the accuracy of monitoring the freezing problem. In addition, in the process from the application startup to shutdown, the freezing problem can only occur once, but the lagging problem can occur multiple times. If the execution state of the Runloop after the task time consumption reaches the preset threshold is not monitored, it would easily mistake the lagging problem as the freezing problem, and thus too many problems may be reported to the remote server. As a result, the remote server could not focus on the freezing problem that has a greater impact on the user experience. In the embodiments of the present disclosure, when it is monitored that the time consumption for executing the task by the Runloop exceeds the preset threshold, the call stack of the first thread is written into the preset file, and the preset file is sent to the remote server only when the freezing application is monitored. In this way, it can reduce the number of reported problems, so that the remote server can focus on the analysis and processing of the application freezing problem and improve the efficiency of analyzing and solving the freezing problem.

Figure 6:
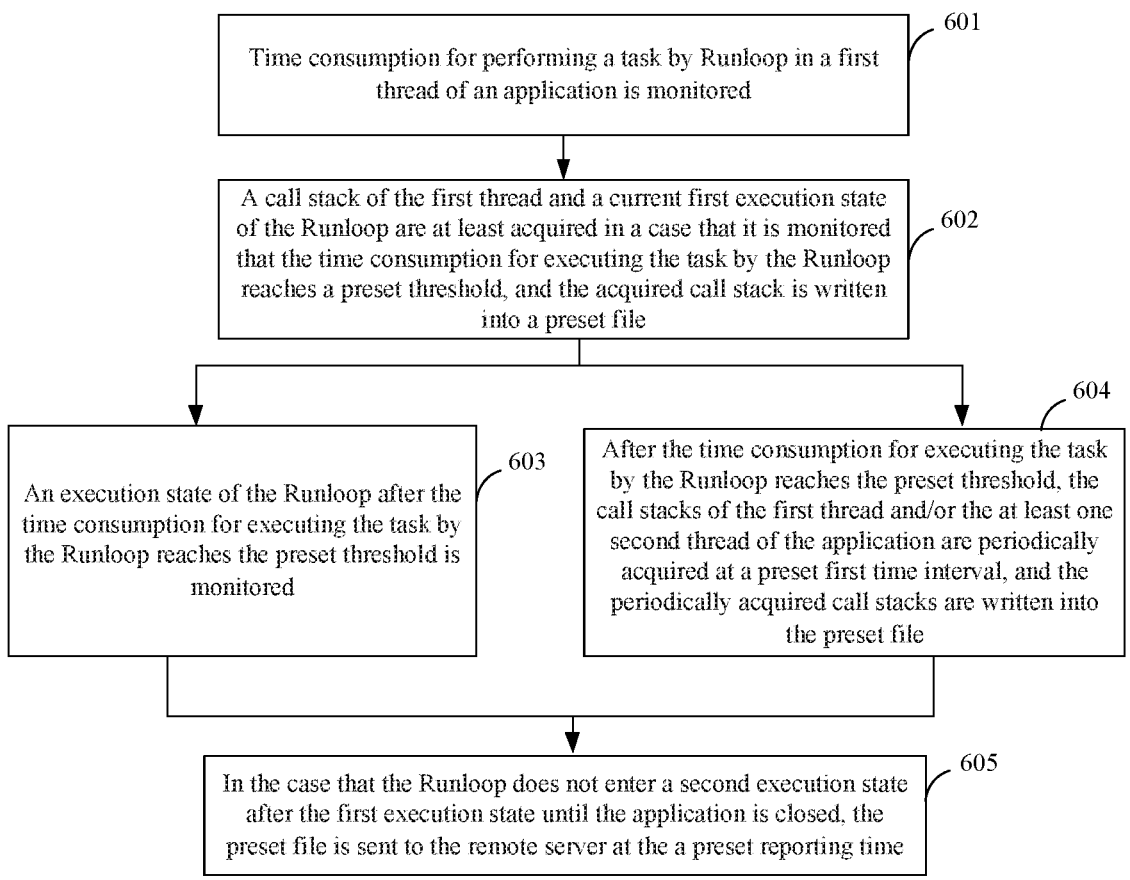
FIG. 6 is a flowchart of a method for monitoring application freezing problem according to another embodiment of the present disclosure.

FIG. 6 is a flowchart of a method for monitoring application freezing problem according to another embodiment of the present disclosure. As shown in FIG. 6, the method includes steps 601 to 605 as follows.

In step 601, time consumption for performing a task by Runloop in a first thread of an application is monitored.

In step 602, a call stack of the first thread and a current first execution state of the Runloop are at least acquired in a case that it is monitored that the time consumption for executing the task by the Runloop reaches a preset threshold, and the acquired call stack is written into a preset file.

In step 603, an execution state of the Runloop after the time consumption for executing the task by the Runloop reaches the preset threshold is monitored.

The execution state of the Runloop after the task time consumption reaches the preset threshold can be obtained at a second time interval until the application is closed or it is monitored that the execution state of the Runloop enters the second execution state.

In step 604, after the time consumption for executing the task by the Runloop reaches the preset threshold, the call stacks of the first thread and/or the at least one second thread of the application are periodically acquired at a preset first time interval, and the periodically acquired call stacks are written into the preset file.

In this embodiment, step 603 and step 604 may be executed in parallel after step 602.

The first time interval and the second time interval may be the same or different. The second thread may be any thread in the application except the first thread.

In this embodiment, after the time consumption for executing the task by the Runloop reaches the preset threshold, the call stacks of the first thread and/or at least one second thread can be acquired at the first time interval, and the periodically acquired call stacks of the first thread and/or at least one second thread can be written into the preset file. An example is shown as follows for better understanding.

Figure 7:
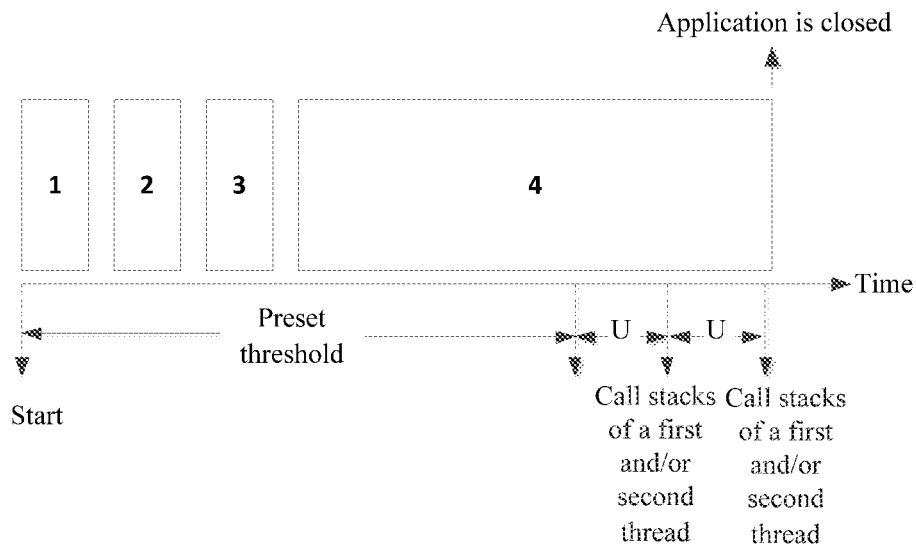
FIG. 7 is a schematic diagram of a method for acquiring a call stack according to an embodiment of the present disclosure.

As an example, FIG. 7 is a schematic diagram of a method for acquiring a call stack according to an embodiment of the present disclosure. Processes 1, 2, 3, and 4 in FIG. 7 correspond to the processes 1, 2, 3, and 4 in FIG. 3, respectively. As shown in FIG. 7, after the time consumption for executing the task by the Runloop in the first thread reaches the preset threshold, the call stacks of the first thread and/or at least one second thread are acquired at the first time interval U, and the acquired call stacks are written into the preset file, in FIG. 7. It is apparent that FIG. 7 is only an illustration, which is not an exclusive limitation to the present disclosure.

In step 605, in the case that the Runloop does not enter a second execution state after the first execution state until the application is closed, the preset file is sent to the remote server at a preset reporting time.

For example, the preset reporting time may be, but not limited to, a time when the application starts for the first time after being frozen and closed.

Taking FIG. 7 as an example again, in FIG. 7, when the Runloop executes the process 4, the time consumption for executing the task by the Runloop exceeds the preset threshold, and the execution state of the Runloop remains unchanged from the execution state of process 4 until the application is closed. In this case, it is determined that the freezing problem of the application occurs, and the preset file of the application is sent to the remote server when the application is started next time. It is apparent that FIG. 7 only shows the scenario of the freezing problem. In practical application, the lagging problem may also occur. In that case, the execution state of the Runloop in FIG. 7 will enter the execution state corresponding to other process after the process 4, before the application is closed, such as the execution state of process 5 in FIG. 3, etc. In this case, it may be determined that the lagging problem occurs instead of the freezing problem, and the preset file may not be sent to the remote server. In addition, in order to save storage space, the call stacks written into the preset file in steps 602 and 604 will be deleted from the preset file.

In addition, it should be noted that, in addition to the call stack information, the preset file may also include other information, such as iOS version information, type and model information of the terminal device, and the like. It is apparent that the above preset file is only an example description, which is not an exclusive limitation on the information in the preset file.

In this embodiment, after it is monitored that the time consumption for executing the task by the Runloop exceeds the preset threshold, the call stacks of the first thread and/or at least one second thread are acquired at the first time interval. When the freezing problem of the application is determined, these call stacks are carried in the preset file and sent to the remote server, which can provide enriched analysis basis for the remote server and improve the accuracy of the freezing problem analysis.

In another embodiment of the present disclosure, the method for monitoring the application freezing problem may further include: determining whether the number of call stacks recorded in the preset file is greater than a preset number; and in a case that the number of call stacks recorded in the preset file is greater than the preset number, retaining the last preset number of call stacks in an acquisition order of call stacks, and deleting other call stacks. For example, if the preset number is 10, when the number of call stacks recorded in the preset file exceeds 10, only the last 10 call stacks can be retained and other call stacks will be deleted. It is apparent that this is only an example. In fact, in other embodiments, after the time consumption for executing the task by the Runloop reaches the preset threshold, the operation of acquiring the call stacks of the first thread and/or the second thread can be periodically executed at the present time interval, and the acquired call stacks are written into the preset file. When the number of operations of acquiring the call stack exceeds the preset number of times, the information of the call stack acquired in the preset file when the task time consumption reaches the preset threshold is kept, and the information of the call stack acquired in one or more acquisition operations after the task time consumption reaches the preset threshold is deleted from the preset file. In this way, only the information of the call stack acquired in the preset number of acquisition operations is kept in the preset file. For example, if the preset number of times is 10, before or after the information of the call stack (including the call stack of the first thread and/or the second thread) acquired by the 11th acquisition operation is written into the preset file, the call stack acquired by the second time (i.e., after the task time consumption reaches the preset threshold, the information of the call stack acquired by executing the acquisition operation for the first time at a preset time interval) is deleted from the preset file, and other information of the call stacks is kept. Before or after the information of the call stack acquired by the 12th acquisition operation is written into the preset file, the information of the call stack acquired by the third time is deleted from the preset file, and so on, until the application is closed.

In addition, it should be noted that, the above step of determining whether the number of call stacks in the preset file is greater than the preset number and the step of deleting redundant call stacks from the preset file, may be executed every time when a new call stack is to be written into the preset file. Alternatively, the above step may be executed before the preset file is reported to the remote server when the freezing problem of the application is determined. In this case, the call stack reported to the remote server is the present number of the call stacks acquired before the application is closed.

In this embodiment, the number of call stacks in the preset file is determined. When the number of call stacks recorded in the preset file is greater than a preset number, the preset number of call stacks acquired last is retained and the rest of the call stacks is deleted. Thus, the problem of a significant number of call stacks due to the long freezing time can be avoided and the storage space can be saved.

Figure 8:
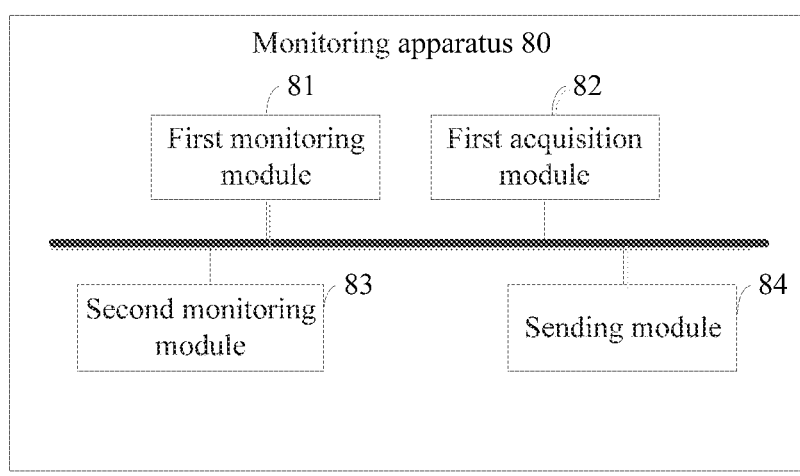
FIG. 8 is a schematic structural diagram of an apparatus for monitoring application freezing problem according to an embodiment of the present disclosure.

FIG. 8 is a schematic structural diagram of an apparatus for monitoring application freezing problem according to an embodiment of the present disclosure. As shown in FIG. 8, the apparatus 80 for monitoring the application freezing problem includes: a first monitoring module 81, a first acquisition module 82, a second monitoring module 83 and a sending module 84.

The first monitoring module 81 is configured to monitor a time consumption for executing a task by Runloop in a first thread of an application, where the application is carried in an iOS system.

The first acquisition module 82 is configured to at least acquire a call stack of the first thread and a current first execution state of the Runloop, in response to monitoring that the time consumption reaches a preset threshold.

The second monitoring module 83 is configured to monitor an execution state of the Runloop after the time consumption reaches the preset threshold.

The sending module 84 is configured to send the call stack of the first thread to a remote server, in a case that the Runloop does not enter a second execution state after the first execution state until the application is closed.

In an implementation, the first monitoring module 81 is further configured to write the call stack of the first thread into a preset file; and the sending module 84 is further configured to send the preset file to the remote server.

In an implementation, the first monitoring module 81 is further configured to: pause a timing for the time consumption for executing the task by the Runloop in the first thread of the application, in response to monitoring that the application is suspended; and resume the timing for the time consumption for executing the task by the Runloop in the first thread of the application in response to monitoring that the application resumes running.

In an implementation, the apparatus 80 further includes: a second acquisition module configured to acquire a call stack of at least one second thread of the application and write the call stack of the at least one second thread into the preset file, in response to monitoring that the time consumption reaches the preset threshold.

In an implementation, the apparatus 80 further includes: a third acquisition module configured to periodically acquire the call stack of the first thread at a preset first time interval, and write the periodically acquired call stack of the first thread into the preset file; or configured to periodically acquire the call stack of the at least one second thread of the application at a preset first time interval, and write the periodically acquired call stack of the at least one second thread into the preset file.

In an implementation, the apparatus 80 further includes: a first processing module configured to retain a preset number of call stacks acquired last in an acquisition order of call stacks recorded in the preset file, and delete other call stacks, in a case that the number of call stacks recorded in the preset file is greater than the preset number.

In an implementation, the apparatus 80 further includes: a task time consumption writing module configured to write the time consumption of for executing the task by the Runloop into the preset file, in a case that the Runloop does not enter the second execution state after the first execution state until the application is closed.

In an implementation, the apparatus 80 further includes: a second processing module configured to delete the call stack recorded in the preset file, in response to monitoring that the execution state of the Runloop enters the second execution state after the first execution state.

The apparatus provided in this embodiment can implement the method in any one of the above-mentioned embodiments in FIG. 2 to FIG. 7, the implementing manner and beneficial effects thereof are similar, details of which will not be repeated here.

A terminal device is further provided according to an embodiment of the present disclosure. The terminal device includes a processor and a memory. A computer program is stored in the memory. The computer program, when executed by the processor, causes the processor to implement the above method of any one of the embodiments in FIG. 2 to FIG. 7.

Figure 9:
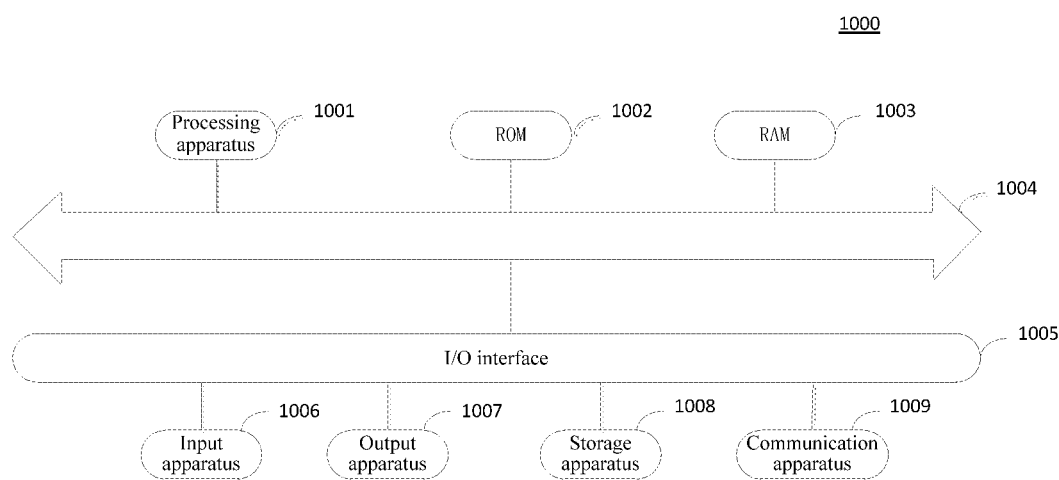
FIG. 9 is a schematic structural diagram of a terminal device according to an embodiment of the present disclosure.

Exemplarily, FIG. 9 illustrates a schematic structural diagram of a terminal device according to an embodiment of the present disclosure. Referring specifically to FIG. 9 below, it shows a schematic structural diagram of a terminal device 1000 applicable for implementing embodiments of the present disclosure. In an embodiment of the present disclosure, the terminal device 1000 may include, but are not limited to, mobile terminals, such as mobile phones, laptops, digital broadcast receivers, PDAs (personal digital assistants), PADs (tablet computers), PMPs (portable multimedia players), vehicle-mounted terminals (such as in-vehicle navigation terminals and the like, and fixed terminals such as digital TVs, desktop computers and the like. It should be noted that the terminal device shown in FIG. 9 is only an example, which should not limit the functions and usage scope of the embodiments of the present disclosure.

As shown in FIG. 9, the terminal device 1000 may include a processing apparatus 1001 (such as a central processing unit and a graphics processor) which may execute various operations and processing through a program stored in a Read Only Memory (ROM) 1002 or a program loaded from the storage apparatus 1008 into a Random Access Memory (RAM) 1003. The RAM 1003 is further configured to store various programs and data required by the terminal device 1000. The processing apparatus 1001, the ROM 1002 and the RAM 1003 are connected to each other via a bus 1004. An Input/output (I/O) interface 1005 is also connected to the bus 1004.

Generally, the I/O interface 1005 may be connected to: an input apparatus 1006, such as a touch screen, a touch panel, a keyboard, a mouse, a camera, a microphone, an accelerometer, and a gyroscope; an output apparatus 1007, such as a liquid crystal display (LCD), a speaker, and a vibrator; a storage apparatus 1008 such as a magnetic tape and a hard disk; and a communication apparatus 1009. The communication apparatus 1009 enables the terminal device 1000 to perform wireless or wired communication with other devices for data exchanging. Although FIG. 9 shows a terminal device 1000 having various components, it should be understood that the illustrated components are not necessarily required to all be implemented or included. Alternatively, more or fewer components may be implemented or included.

Particularly, according to some embodiments of the present disclosure, the process described above in conjunction with flow charts may be implemented as a computer program. For example, a computer program product is further provided according to some embodiments of the present disclosure, including a computer program carried on a non-transitory computer readable medium. The computer program includes program codes for performing the method shown in the flow charts. In the embodiments, the computer program may be downloaded and installed from a network via the communication apparatus 1009, or installed from the storage apparatus 1008, or installed from the ROM 1002. When the computer program is executed by the processing apparatus 1001, the above steps defined in the method according to the embodiments of the present disclosure are performed.

It should be noted that, the computer readable medium mentioned herein may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In some embodiments of the present disclosure, the computer readable storage medium may be any tangible medium containing or storing a program, and the program may be used by or in combination with an instruction execution system, apparatus, or device. In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium and can send, propagate or transmit programs to be used by or with an instruction execution system, apparatus or device. The program codes stored in the computer readable medium may be transmitted via any proper medium including but not limited to: wired, optical fiber cable, radio frequency (RF), or any suitable combination of the foregoing.

In some embodiments, clients and servers can communicate using any currently known or future developed network protocols, such as Hyper Text Transfer Protocol (HTTP), and can be interconnected with any form or medium of digital data communication (e.g., a communication network). Examples of communication networks include local area networks ("LANs"), wide area networks ("WANs"), internetworks (e.g., the Internet), and peer-to-peer networks (e.g., ad hoc peer-to-peer networks), as well as any currently known or future developed networks.

The above computer readable medium may be included in the above terminal device or may exist independently without being assembled into the terminal device.

The above computer readable medium carries one or more programs, and when the above one or more programs are executed by the terminal device, it can cause the terminal device to implement as follows: monitoring a time consumption for executing a task by a message loop mechanism Runloop in a first thread of an application, where the application is carried in an iOS system; at least acquiring a call stack of the first thread and a current first execution state of the Runloop, in response to monitoring that the time consumption reaches a preset threshold, and writing the call stack into the present file; monitoring an execution state of the Runloop after the time consumption reaches the preset threshold; and sending the present file to a remote server, in a case that the Runloop does not enter a second execution state after the first execution state until the application is closed.

Computer program code for performing operations in embodiments of the present disclosure may be written in one or more programming languages, or a combination thereof. The programming language includes, but is not limited to, an object oriented programming language, such as Java, Smalltalk, and C++, or conventional procedural programming languages, such as "C" language and the like. The program code may be executed entirely on a user computer, or be executed partly on the user computer, or be executed as a stand-alone software package, or be executed partly on the user computer and partly on a remote computer or be executed entirely on the remote computer or server. In a case that the execution of the program code involves a remote computer, the remote computer may be connected to a user computer via any network, including a local area network (LAN) or a wide area network (WAN), or may be connected to an external computer (for example, via an Internet provided by an Internet service provider).

The flow charts and schematic diagrams in the Figures show the architecture, functionality and operations of possible implementations of the system, method and computer program product provided according to the embodiments of the present disclosure. Each of blocks in the flow charts or schematic diagrams may represent a module, a program segment, or a part of code, and the module, the program segment, or the part of code includes one or more executable instructions for implementing specified logical functions. It should be noted that in some alternative implementations, the functions noted in the blocks may be implemented in a different order than those illustrated in the Figures. For example, two blocks shown in succession may in fact be executed substantially in parallel, or sometimes be executed in a reverse order, depending upon functions involved. It should be further noted that each block in the schematic diagrams and/or flow charts, and combinations of blocks in the schematic diagrams and/or flowcharts, may be implemented by a dedicated hardware-based system configured to implement specified functions or operations, or may be implemented by using a combination of dedicated hardware and computer instructions.

The units mentioned in the description of the embodiments of the present disclosure may be implemented by means of software, or otherwise by means of hardware. The designation of a unit does not in any case constitute a limitation to the unit itself.

The functions described herein above may be executed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and the like.

In the context of the present disclosure, a machine readable medium may be a tangible medium that may contain or store a program to be used by or in combination with an instruction execution system, apparatus or device. The machine readable medium may be a machine readable signal medium or a machine readable storage medium. The machine readable medium may include, but is not limited to, a system, an apparatus, or a device in an electronic, magnetic, optical, electromagnetic, infrared, or semi-conductive form, or any proper combination thereof. The machine readable storage medium may include an electrical connection based on one or more wires, a portable computer disk, a hard disk, a Random Access Memory (RAM), a Read Only Memory (ROM), an Erasable Programmable Read Only Memory (EPROM or flash memory), an optical fiber, a portable compact disc read only memory (CD-ROM), a light storage device, a magnetic storage device or any proper combination thereof.

A computer readable store medium is further provided according to an embodiment of the present disclosure, the computer readable store medium storing a computer program thereon, where the computer program, when executed by a processor, causes the processor to implement the above method of any one of the embodiments in FIG. 2 to FIG. 7. Its implementing manner and beneficial effects are similar, details of which will not be repeated here.

A computer program product is further provided according to an embodiment of the present disclosure. The computer program product includes a computer program. The computer program, when executed by a processor, causes the processor to implement the above method of any one of the embodiments in FIG. 2 to FIG. 7. The implementing manner and beneficial effects thereof are similar, details of which will not be repeated herein.

It should be noted that the relationship terms "first", "second" and the like herein are used for distinguishing an entity or operation from another entity or operation, but not intended to necessitate or imply an actual relationship or order between these entities or operations. Further, the terms "include", "comprise" or any variant thereof are intended to encompass nonexclusive inclusion such that a process, method, article or device including a series of elements includes not only those elements but also other elements which have not been listed definitely or an element(s) inherent to the process, method, article or device. Unless expressively limited otherwise, a process, method, article or device limited by "comprising/including a(n) . . . " does not exclude existence of another identical element in such process, method, article or device.

The above are only specific implementations of the present disclosure, such that those skilled in the art can understand or implement the present disclosure. It is obvious for those skilled in the art to make various modifications to these embodiments. The general principle defined herein may be applied to other embodiments without departing from the scope of the present disclosure. Therefore, the present disclosure is not limited to the embodiments illustrated herein, rather, should be defined by the broadest scope consistent with the principle and novel features disclosed herein.

It should be noted that the relationship terms "first", "second" and the like herein are used for distinguishing an entity or operation from another entity or operation, but not intended to necessitate or imply an actual relationship or order between these entities or operations. Further, the terms "include", "comprise" or any variant thereof are intended to encompass nonexclusive inclusion such that a process, method, article or device including a series of elements includes not only those elements but also other elements which have not been listed definitely or an element(s) inherent to the process, method, article or device. Unless expressively limited otherwise, a process, method, article or device limited by "comprising/including a(n) . . . " does not exclude existence of another identical element in such process, method, article or device.

The above are only specific implementations of the present disclosure, such that those skilled in the art can understand or implement the present disclosure. It is obvious for those skilled in the art to make various modifications to these embodiments. The general principle defined herein may be applied to other embodiments without departing from the spirit or scope of the present disclosure. Therefore, the present disclosure is not limited to the embodiments illustrated herein, rather, should be defined by the broadest scope consistent with the principle and novel features disclosed herein.

The invention claimed is:

1. A method for monitoring application freezing problem, comprising:
   monitoring time consumption for executing a task by a message loop mechanism (Runloop), in a first thread of an application, wherein the application is an application carried in an iOS system;
   acquiring a call stack of the first thread and a current first execution state of the Runloop, in a case that it is monitored that the time consumption reaches a preset threshold;
   monitoring an execution state of the Runloop after the time consumption reaches the preset threshold; and
   sending the call stack of the first thread to a remote server, in a case that the Runloop does not enter a second execution state after the first execution state until the application is closed.

2. The method according to claim 1, further comprising: writing the call stack of the first thread into a preset file, wherein the sending the call stack of the first thread to the remote server comprises:
   sending the preset file to the remote server.

3. The method according to claim 1, wherein the monitoring the time consumption for executing the task by the Runloop in the first thread of the application comprises:
   pausing a timing for the time consumption for executing the task by the Runloop in the first thread of the application, in response to monitoring that the application is suspended; and
   resuming the timing for the time consumption for executing the task by the Runloop in the first thread of the application, in response to monitoring that the application resumes running.

4. The method according to claim 2, wherein in the case that it is monitored that the time consumption reaches a preset threshold, the method further comprises:
   acquiring a call stack of at least one second thread of the application, and writing the call stack of the at least one second thread into the preset file.

5. The method according to claim 2, wherein the acquiring the call stack of the first thread comprises:
   periodically acquiring the call stack of the first thread at a preset first time interval; and
   the writing the call stack of the first thread into the preset file comprises:
   writing the periodically acquired call stack of the first thread into the preset file.

6. The method according to claim 5, further comprising:
   in a case that the number of call stacks recorded in the preset file is greater than a preset number, retaining the preset number of call stacks acquired last in an acquisition order of call stacks recorded in the preset file, and deleting other call stacks.

7. The method according to claim 1, wherein before the sending the call stack of the first thread to the remote server, in the case that the Runloop does not enter a second execution state after the first execution state until the application is closed, the method further comprises:
   writing the time consumption for executing the task by the Runloop into the preset file.

8. The method according to claim 2, further comprising:
   deleting the call stack recorded in the preset file, in a case that it is monitored that the execution state of the Runloop enters the second execution state after the first execution state.

9. A terminal device, comprising:
   a processor;
   a memory, configured to store a computer program;
   wherein the computer program, when executed by a processor, causes the processor to monitor time consumption for executing a task by a message loop mechanism (Runloop), in a first thread of an application, wherein the application is an application carried in an iOS system;
   acquire a call stack of the first thread and a current first execution state of the Runloop, in a case that it is monitored that the time consumption reaches a preset threshold;
   monitor an execution state of the Runloop after the time consumption reaches the preset threshold; and
   send the all stack of the first thread to a remote server, in a case that the Runloop does not enter a second execution state after the first execution state until the application is closed.

10. A non-transitory computer readable store medium storing a computer program thereon, wherein the computer program, when executed by a processor, causes the processor to:
   monitor time consumption for executing a task by a message loop mechanism (Runloop), in a first thread of an application, wherein the application is an application carried in an iOS system;

acquire a call stack of the first thread and a current first execution state of the Runloop, in a case that it is monitored that the time consumption reaches a preset threshold;

monitor an execution state of the Runloop after the time consumption reaches the preset threshold; and send the call stack of the first thread to a remote server, in a case that the Runloop does not enter a second execution state after the first execution state until the application is closed.

11. The method according to claim 4, wherein the acquiring the call stack of at least one second thread of the application, and writing the call stack of the at least one second thread into the preset file comprises:

periodically acquiring the call stack of the at least one second thread of the application at the preset first time interval, and writing the periodically acquired call stack of the at least one second thread into the preset file.

12. The terminal device according to claim 9, wherein the computer program, when executed by a processor, causes the processor to:

write the call stack of the first thread into a preset file; and
send the preset file to the remote server.

13. The terminal device according to claim 9, wherein the computer program, when executed by a processor, causes the processor to:

pause a timing for the time consumption for executing the task by the Runloop in the first thread of the application, in response to monitoring that the application is suspended; and resume the timing for the time consumption for executing the task by the Runloop in the first thread of the application, in response to monitoring that the application resumes running.

14. The terminal device according to claim 12, wherein the computer program, when executed by a processor, causes the processor to:

acquire a call stack of at least one second thread of the application and write the call stack of the at least one second thread into the preset file, in the case that it is monitored that the time consumption reaches the preset threshold.

15. The terminal device according to claim 12, wherein the computer program, when executed by a processor, causes the processor to:

periodically acquire the call stack of the first thread at a preset first time interval; and write the periodically acquired call stack of the first thread into the preset file.

16. The terminal device according to claim 15, wherein the computer program, when executed by a processor, causes the processor to:

in a case that the number of call stacks recorded in the preset file is greater than a preset number, retain the preset number of call stacks acquired last in an acquisition order of call stacks recorded in the preset file, and delete other call stacks.

17. The terminal device according to claim 14, wherein the computer program, when executed by a processor, causes the processor to:

periodically acquire the call stack of the at least one second thread of the application at the preset first time interval, and write the periodically acquired call stack of the at least one second thread into the preset file.

18. The terminal device according to claim 9, wherein the computer program, when executed by a processor, causes the processor to:

write the time consumption for executing the task by the Runloop into the preset file, in the case that the Runloop does not enter a second execution state after the first execution state until the application is closed.

19. The terminal device according to claim 12, wherein the computer program, when executed by a processor, causes the processor to:

delete the call stack recorded in the preset file, in a case that it is monitored that the execution state of the Runloop enters the second execution state after the first execution state.

* * * * *